United States Patent
Touze et al.

(10) Patent No.: US 12,519,960 B2
(45) Date of Patent: Jan. 6, 2026

(54) METHOD FOR CORRECTING SDR PICTURES IN A SL-HDR1 SYSTEM

(71) Applicant: InterDigital CE Patent Holdings, SAS, Paris (FR)

(72) Inventors: David Touze, Rennes (FR); Frederic Plissonneau, Thorigne-Fouillard (FR); Laurent Cauvin, Chevaigne (FR); Guillaume Poirier, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/853,259

(22) PCT Filed: Mar. 21, 2023

(86) PCT No.: PCT/EP2023/057118
§ 371 (c)(1),
(2) Date: Oct. 1, 2024

(87) PCT Pub. No.: WO2023/194089
PCT Pub. Date: Oct. 12, 2023

(65) Prior Publication Data
US 2025/0240436 A1 Jul. 24, 2025

(30) Foreign Application Priority Data
Apr. 4, 2022 (EP) .................................... 22305441

(51) Int. Cl.
*H04N 19/186* (2014.01)
*G06T 7/90* (2017.01)
(Continued)

(52) U.S. Cl.
CPC ............. *H04N 19/186* (2014.11); *G06T 7/90* (2017.01); *G06V 10/60* (2022.01); *H04N 1/60* (2013.01); *G06T 2207/10024* (2013.01)

(58) Field of Classification Search
CPC ..................................................... H04N 19/186
See application file for complete search history.

(56) References Cited

U.S. PATENT DOCUMENTS

| 2015/0092850 A1* | 4/2015 | Talebi Esfandarani ........ H04N 19/105 375/240.12 |
| 2021/0195221 A1* | 6/2021 | Song .................... H04N 19/154 |
| 2023/0394636 A1* | 12/2023 | Touze ........................ G06T 5/20 |

FOREIGN PATENT DOCUMENTS

WO  WO 2019101373 A1  5/2019

OTHER PUBLICATIONS

"Information Technology—High efficiency Coding and Media Delivery in Heterogeneous Environments—Part 2: High Efficiency Video Coding", International Organization for Standardization, ISO/IEC JTC 1/SC 29/WG 11 N17661, ISO/IEC DIS 23008-2:201x, 4th Edition, Apr. 20, 2018, 874 pages.

(Continued)

*Primary Examiner* — Jayanti K Patel
*Assistant Examiner* — Christopher Kingsbury Glover
(74) *Attorney, Agent, or Firm* — Condo Roccia Koptiw LLP

(57) ABSTRACT

A method for correcting a SDR video in a SL-HDR1 system comprising identifying samples of a SDR picture the chroma components values of which risking to be clipped during a SL-HDR1 process; and, correcting the identified samples to prevent from the clipping before a generation of a HDR picture from the SDR picture.

13 Claims, 7 Drawing Sheets

(51) Int. Cl.
  *G06V 10/60* (2022.01)
  *H04N 1/60* (2006.01)

(56) References Cited

OTHER PUBLICATIONS

"Information technology—General video coding—Part 1: Essential video coding", International Organization for Standardization (ISO), Coding of audio, picture, multimedia and hypermedia information, ISO/IEC JTC 1/SC 29, Document: ISO/IEC FDIS 23094-1, Oct. 2020, 351 pages.
"High-Performance Single Layer High Dynamic Range (HDR) System for use in Consumer Electronics devices; Part 1: Directly Standard Dynamic Range (SDR) Compatible HDR System (SL-HDR1)", European Broadcasting Union (EBU), European Telecommunication Standards Institute (ETSI), Technical Specification ETSI TS 103 433-1 v1.4.1, Aug. 2021, 136 pages.
"Advanced Video Coding for Generic Audiovisual Services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Jan. 2012, 680 pages.
"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

* cited by examiner

METHOD FOR CORRECTING SDR PICTURES IN A SL-HDR1 SYSTEM

1. CROSS REFERENCE TO RELATED APPLICATION

This application is a U.S. National Stage Application under 35 U.S.C. § 371 of International Patent Application No. PCT/EP2023/057118, filed Mar. 21, 2023, which is incorporated herein by reference in its entirety.

This application claims priority to European Application No. EP22305441.2 filed Apr. 4, 2022, which is incorporated herein by reference in its entirety.

2. TECHNICAL FIELD

At least one of the present embodiments generally relates to the field of production of High Dynamic Range (HDR) video and more particularly to a method, a device and an equipment to generate a HDR content from a SDR content in a system with varying level of precision for computations and data representation.

3. BACKGROUND

Recent advancements in display technologies are beginning to allow for an extended dynamic range of color, luminance and contrast in images to be displayed. The term image refers here to an image content that can be for example a video or a still picture or image.

High-dynamic-range video (HDR video) describes video having a dynamic range greater than that of standard-dynamic-range video (SDR video). HDR video involves capture, production, content/encoding, and display. HDR capture and display devices are capable of brighter whites and deeper blacks. To accommodate this, HDR encoding standards allow for a higher maximum luminance and use at least a 10-bit dynamic range (compared to 8-bit for non-professional and 10-bit for professional SDR video) in order to maintain precision across this extended range.

HDR production is a new domain and there will be a transition phase during which both HDR contents and SDR contents will coexist. During this coexistence phase, a same live content will be produced simultaneously in a HDR and a SDR version and distributed via a SDR/HDR distribution system to SDR and HDR capable devices. A user can then display the HDR or the SDR version of the content depending on his preferences or capabilities.

A SDR/HDR distribution system is composed of various modules comprising production systems, post production modules, pre-processor modules, encoding modules, decoding modules, post-processor modules and display modules. A production module could be for example, a HDR or SDR camera. A post-production module could be a module for color grading, insertion of special effects, tone mapping or inverse tone mapping. A pre-processor module could adapt a content to a SL-HDRx (x being 1, 2 or 3) standard for instance by generating a SDR video content with SL-HDRx metadata. The encoding module could encode the SDR video content and the metadata into a video compression format such as HEVC or VVC. The decoding module decodes the encoded SDR video content and metadata. The post-processor module could generate a HDR video content from the SDR video content and the SL-HDRx metadata. The display module is in charge of displaying the decoder SDR video or generated HDR video.

In such SDR/HDR distribution system, each module could be managed by a different entity. For instance, a first entity could manage the production module, the post-production module, the pre-processor module and the encoding module and a second entity could manage the decoding module, the post-processor module and the display module. Each entity has no control on the implementation of the various modules managed by the other entity. Therefore, even if each entity respect a same standard such as SL-HDRx, each entity is free to define at which level of precisions are performed the internal calculations of the modules it is in charge of. For instance, one entity can decide to perform the calculations of the pre-processing module in floating points while the other entity can decide that the calculations performed by the post-processing module are performed in integer with a given bit-depth precision and in a given range of values. Such drift in the precision of the internal calculations between modules can provoke inacceptable errors in a displayed HDR video generally due to clipping of some values during the calculations.

It is desirable to overcome the above drawbacks.

It is particularly desirable to propose a system that allows avoiding or limiting display errors due to clipping.

4. BRIEF SUMMARY

In a first aspect, one or more of the present embodiments provide a method comprising: obtaining chroma components from a current sample of an input SDR picture using a color correction function; estimating a clipping factor based on the obtained chroma components and on a first range; representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor; obtaining a luma value of a sample of a corrected SDR picture corresponding to the sample of the input SDR picture using a division of the first sub-part by the correction factor to a power equal to the first ratio; and, for each chroma component, obtaining a chroma value for the sample of the corrected SDR picture corresponding to the sample of the input SDR picture by dividing the second sub-part of the chroma component by the correction factor to a power equal to the second ratio.

In an embodiment, the first and second ratio depend on a characteristic of the current sample, the characteristic comprising a value representative of a brightness of the current sample and/or a value representative of a saturation of the current sample.

In a second aspect, one or more of the present embodiments provide a method wherein the method of the first aspect is applied to all samples of an input SDR picture and wherein the first and second ratio is fixed for all samples of the input SDR picture and depends on a characteristic of the input SDR picture, the characteristic comprising a value representative of a brightness of the input SDR picture and/or a value representative of a saturation of the input SDR picture.

In a third aspect, one or more of the present embodiments provide a method wherein the method of the first aspect is applied to all samples of an input SDR picture of a SDR video and wherein the first and the second ratio are fixed for all samples of all SDR pictures of the SDR video.

In an embodiment of the first, second or third aspect, the first and the second ratio depends on a single value.

In an embodiment, the method of the first, second and third aspect is performed in a process for generating SDR pictures or in a process for ingesting SDR pictures.

In a fourth aspect, one or more of the present embodiments provide a device comprising electronic circuitry configured for: obtaining chroma components from a current sample of an input SDR picture using a color correction function; estimating a clipping factor based on the obtained chroma components and on a first range; representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor; obtaining a luma value of a sample of a corrected SDR picture corresponding to the sample of the input SDR picture by using a division of the first sub-part by the correction factor to a power equal to the first ratio; and, for each chroma component, obtaining a chroma value for the sample of the corrected SDR picture corresponding to the sample of the input SDR picture by using a division of the second sub-part of the chroma component by the correction factor to a power equal to the second ratio.

In an embodiment, the first and second ratio depend on a characteristic of the current sample, the characteristic comprising a value representative of a brightness of the current sample and/or a value representative of a saturation of the current sample.

In a fifth aspect, one or more of the present embodiments provide a device comprising electronic circuitry adapted to process each sample of an input SDR picture by: obtaining chroma components from a current sample of an input SDR picture using a color correction function; estimating a clipping factor based on the obtained chroma components and on a first range; representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor; obtaining a luma value of a sample of a corrected SDR picture corresponding to the sample of the input SDR picture by dividing the first sub-part by the correction factor to a power equal to the first ratio; and, for each chroma component, obtaining a chroma value for the sample of the corrected SDR picture corresponding to the sample of the input SDR picture by dividing the second sub-part of the chroma component by the correction factor to a power equal to the second ratio; and wherein the first and second ratio is fixed for all samples of the input SDR picture and depends on a characteristic of the input SDR picture, the characteristic comprising a value representative of a brightness of the input SDR picture and/or a value representative of a saturation of the input SDR picture.

In a sixth aspect, one or more of the present embodiments provide a device comprising electronic circuitry adapted to process each sample of an input SDR picture of a SDR video by: obtaining chroma components from a current sample of an input SDR picture using a color correction function; estimating a clipping factor based on the obtained chroma components and on a first range; representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor; obtaining a luma value of a sample of a corrected SDR picture corresponding to the sample of the input SDR picture using a division of the first sub-part by the correction factor to a power equal to the first ratio; and, for each chroma component, obtaining a chroma value for the sample of the corrected SDR picture corresponding to the sample of the input SDR picture by using a division of the second sub-part of the chroma component by the correction factor to a power equal to the second ratio; and wherein the first and the second ratio are fixed for all samples of all SDR pictures of the SDR video.

In an embodiment of the fourth, fifth and sixth aspect, the first and the second ratio depends on a single value.

In an embodiment, the device of the fourth, fifth and sixth aspect is for generating SDR pictures or for ingesting SDR pictures.

In a seventh aspect, one or more of the present embodiments provide a computer program comprising program code instructions for implementing the method according to the first, second or third aspect.

In a eighth aspect, one or more of the present embodiments provide a non-transitory information storage medium storing program code instructions for implementing the method according to the first, second or third aspect.

5. BRIEF SUMMARY OF THE DRAWINGS

6. DETAILED DESCRIPTION

Figure 1:
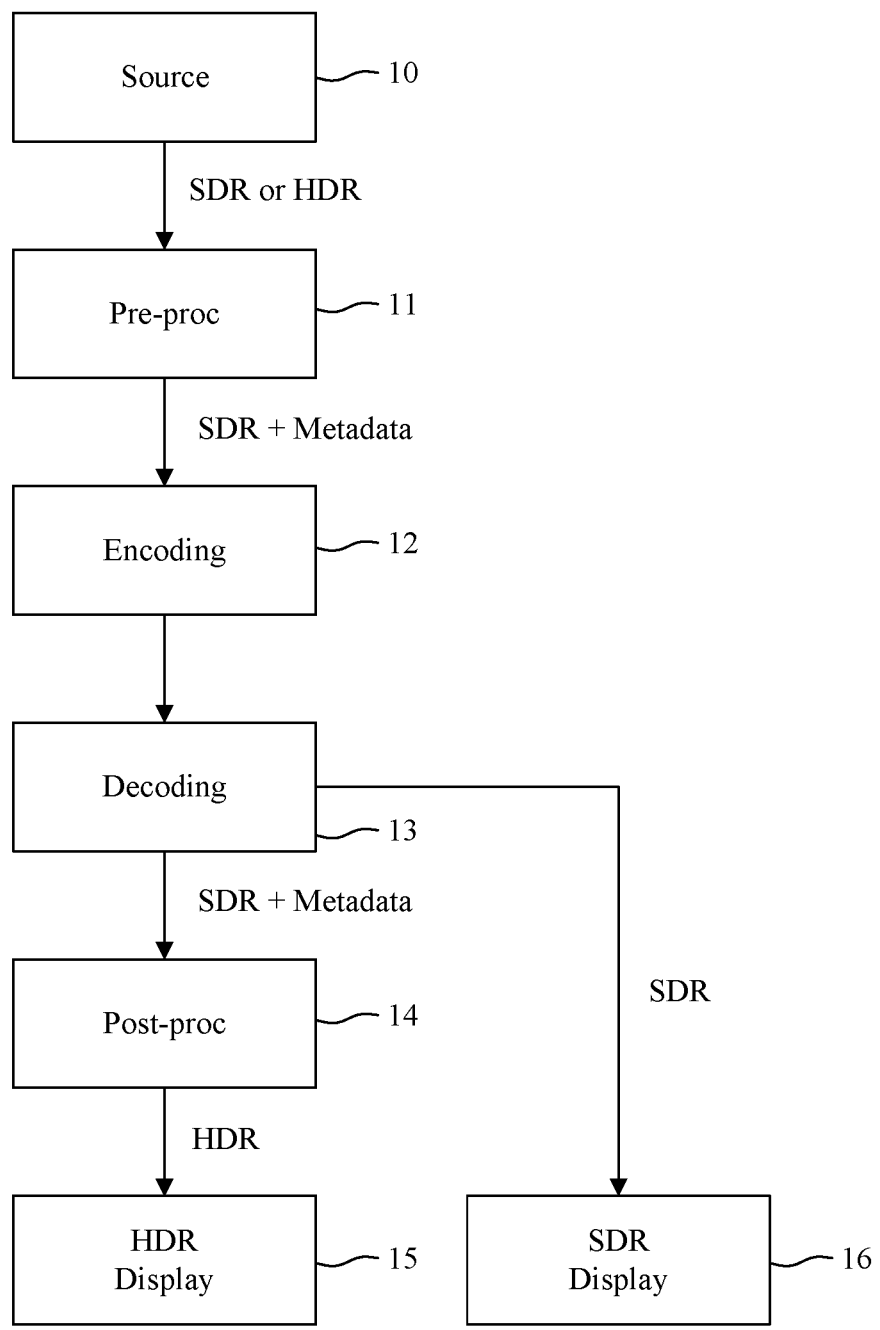
FIG. 1 illustrates schematically an example of context in which the various embodiments are implemented.

FIG. 1 illustrates schematically an example of context in which the various embodiments are implemented.

In FIG. 1, a source device 10, such as a camera or a streaming system providing a video content, generates a video content. The source device 10 is for instance a SDR or HDR camera generating respectively a SDR or HDR video content.

The video content is then provided to a pre-processing module 11. The pre-processing module 11, for example, adapts a content to a SL-HDRx standard. For instance, the SL-HDRx standard is SL-HDR1. Therefore, when the video content is a SDR video, the pre-processing module generates SL-HDR1 metadata based on the SDR video. When the video content is a HDR video, the pre-processing module applies a tone mapping (TM) to the HDR video to generate a SDR video and generates SL-HDR1 metadata. The SL-HDR1 metadata comprise information representative of an inverse tone mapping function and of a color correction function allowing to obtain a HDR video from a SDR video.

The SDR video and the SL-HDR1 metadata are then provided to an encoding module 12. The SDR video and the SL-HDR1 metadata are encoded by the encoding module in a bitstream using a video compression format such as AVC ((ISO/CEI 14496-10/ITU-T H.264), HEVC (ISO/IEC 23008-2—MPEG-H Part 2, High Efficiency Video Coding/ITU-T H.265)), VVC (ISO/IEC 23090-3—MPEG-I, Versatile Video Coding/ITU-T H.266), AV1, VP9, EVC (ISO/CEI 23094-1 Essential Video Coding) or any other video compression format adapted to encode a SDR video and SL-HDR1 metadata. The output of the encoding module 12 is a bitstream representing the encoded SDR video and the SL-HDR1 metadata.

The encoding module 12 then provides the bitstream to a decoding module 13 for instance via a network. The decoding module 13 decodes the bitstream to obtain a decoded version of the SDR video and the SL-HDR1 metadata.

The SDR video is provided directly to a display device 16 adapted to display SDR contents.

The SDR video and the SL-HDR1 metadata are also provided to a post-processing module 14. The post-processing 14 module applies an inverse tone mapping (ITM) and a color correction to the SDR video to obtain an HDR video using an ITM function and a color correction function derived from the SL-HDR1 metadata.

The HDR video is then provided to a display device 15 adapted to display HDR contents.

Figure 7A:
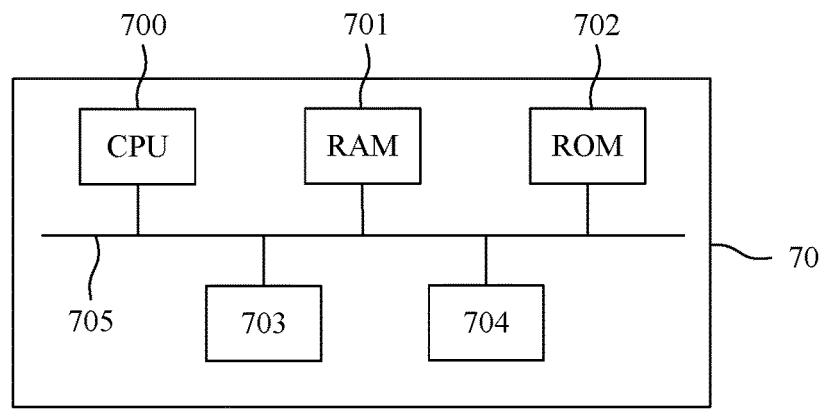
FIG. 7A illustrates schematically an example of hardware architecture of a processing module able to implement various aspects and embodiments.

FIG. 7A illustrates schematically an example of hardware architecture of a processing module 70 used for instance in the pre-processing module 11 or in the post-processing module 14. The processing module 70 comprises, connected by a communication bus 705: a processor or CPU (central processing unit) 700 encompassing one or more microprocessors, general purpose computers, special purpose computers, and processors based on a multi-core architecture, as non-limiting examples; a random access memory (RAM) 701; a read only memory (ROM) 702; a storage unit 703, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 704 for exchanging data with other modules, devices, systems or equipment. The communication interface 704 can include, but is not limited to, a transceiver configured to transmit and to receive data over a communication network 71. The communication interface 704 can include, but is not limited to, a modem or a network card.

For example, the communication interface 704 enables for instance the processing module 70 to receive the HDR or SDR data and to output HDR or SDR data along with SL-HDR1 metadata.

The processor 700 is capable of executing instructions loaded into the RAM 701 from the ROM 702, from an external memory (not shown), from a storage medium, or from a communication network. When the processing module 70 is powered up, the processor 700 is capable of reading instructions from the RAM 701 and executing them. When the processing module 70 is comprised in the pre-processing module 11, these instructions form a computer program causing, for example, the implementation by the processor 700 of a TM process (when the source module generates a HDR video) and, in an embodiment, the process of FIG. 5. When the processing module 70 is comprised in the post-processing module 14, these instructions form a computer program causing, for example, the implementation by the processor 700 of an ITM process and, in an embodiment represented in FIG. 4, the process of FIG. 5.

All or some of the algorithms and steps of said processes may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 7B:
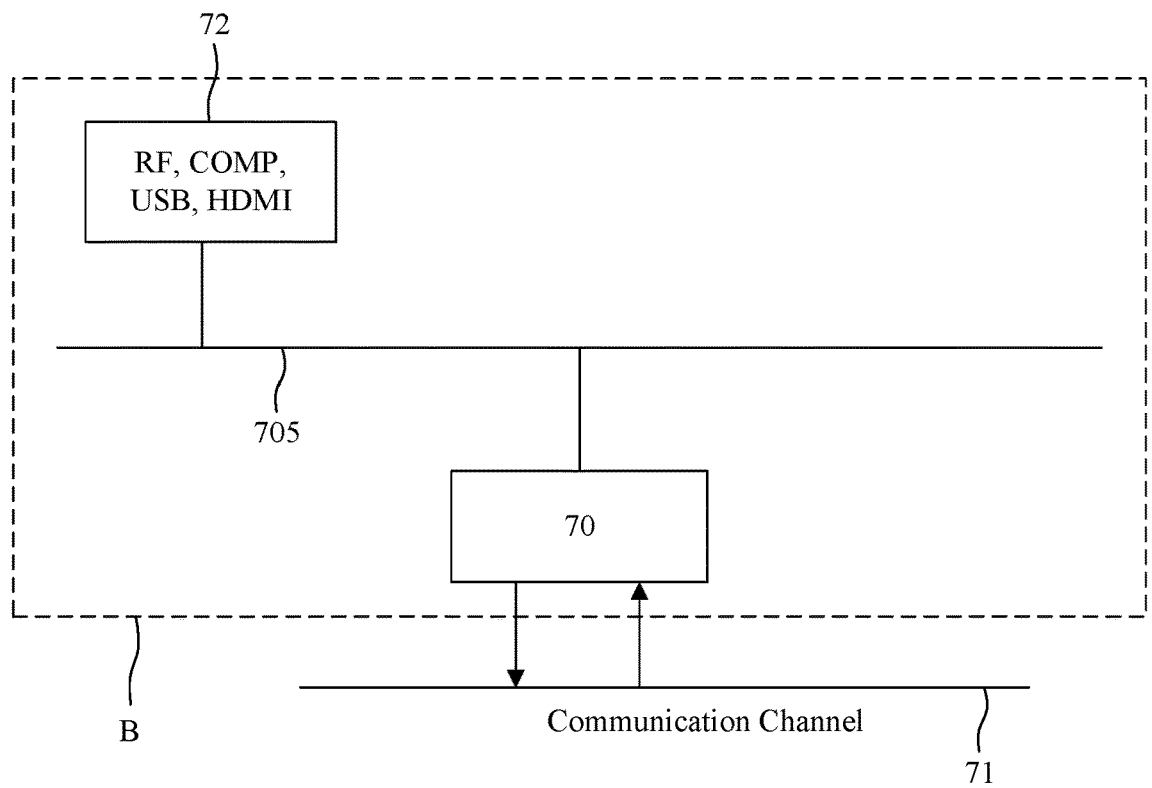
FIG. 7B illustrates a block diagram of an example of a first system in which various aspects and embodiments are implemented; and, FIG. 7C illustrates a block diagram of an example of a second system in which various aspects and embodiments are implemented.
Figure 7C:
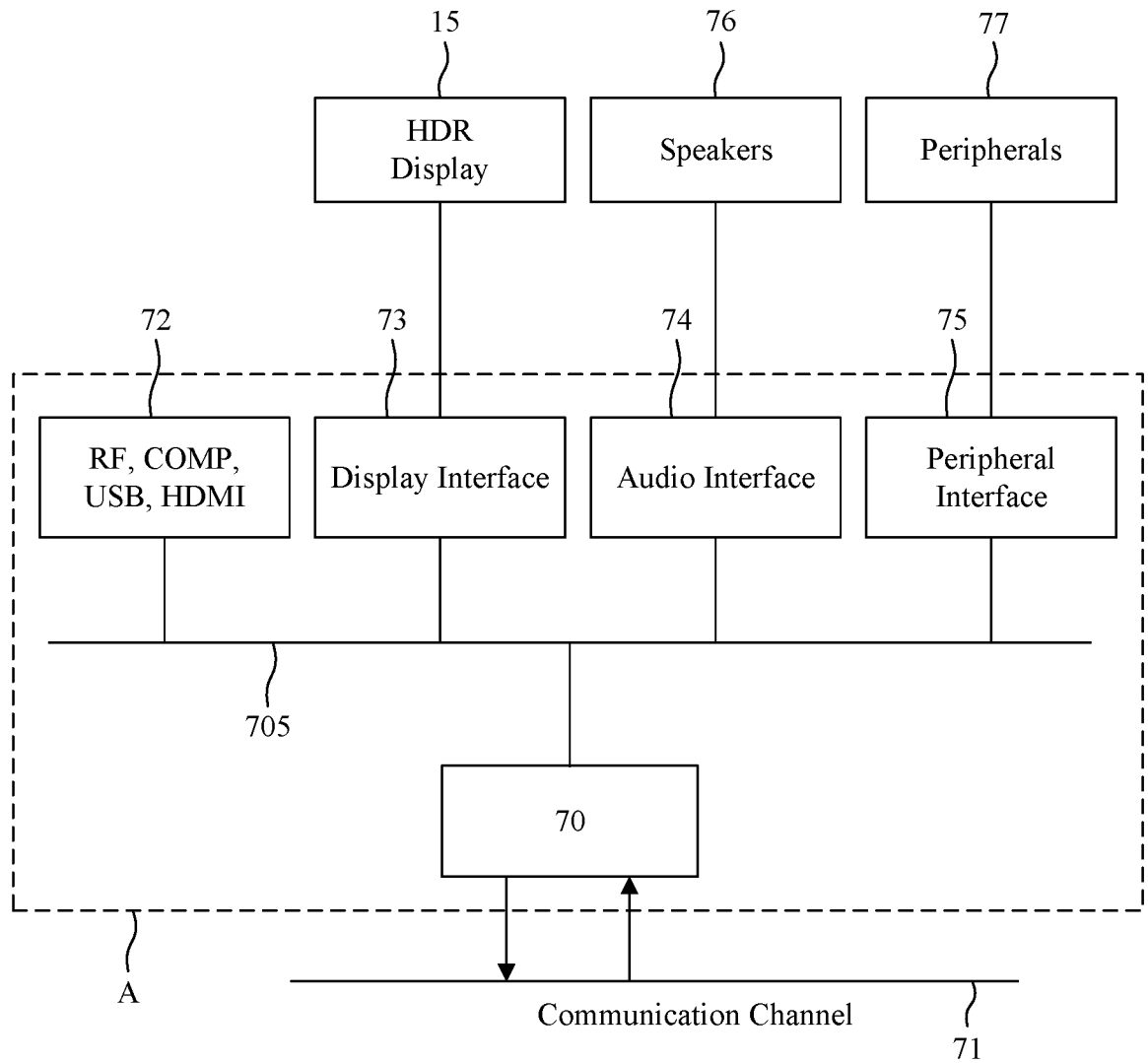

FIG. 7C illustrates a block diagram of an example of a system A implementing a post processing module in which various aspects and embodiments are implemented.

System A can be embodied as a device including various components or modules and is configured to generate a HDR displayable video. Examples of such system include, but are not limited to, various electronic systems such as personal computers, laptop computers, smartphones, tablet, TV, or set top boxes. Components of system A, singly or in combination, can be embodied in a single integrated circuit (IC), multiple ICs, and/or discrete components. For example, in at least one embodiment, the system A comprises one processing module 70 that implements the post-processing module 14. In various embodiments, the system A is communicatively coupled to one or more other systems, or other electronic devices, via, for example, a communication bus or through dedicated input and/or output ports.

The input to the processing module 70 can be provided through various input modules as indicated in a block 72. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 7C, include composite video.

In various embodiments, the input modules of block 72 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system A to other electronic devices across USB and/or HDMI connections. It is to be understood that various aspects of input processing, for example, Reed-Solomon error correction, can be implemented, for example, within a separate input processing IC or within the processing module 70 as necessary. Similarly, aspects of USB or HDMI interface processing can be implemented within separate interface ICs or within the processing module 70 as necessary. The demodulated, error corrected, and demultiplexed stream is provided to the processing module 70.

Various elements of system A can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system A, the processing module 70 is interconnected to other elements of said system A by the bus 705.

The communication interface 704 of the processing module 70 allows the system A to communicate on the communication network 71. The communication network 71 can be implemented, for example, within a wired and/or a wireless medium.

Data is streamed, or otherwise provided, to the system A, in various embodiments, using a wireless network such as a Wi-Fi network, for example IEEE 802.11 (IEEE refers to the Institute of Electrical and Electronics Engineers). The Wi-Fi signal of these embodiments is received over the communications network 71 and the communications interface 704 which are adapted for Wi-Fi communications. The communications network 71 of these embodiments is typically connected to an access point or router that provides access to external networks including the Internet for allowing streaming applications and other over-the-top communications. Still other embodiments provide streamed data to the system A using the RF connection of the input block 72. As indicated above, various embodiments provide data in a non-streaming manner, for example, when the system A is a smartphone or a tablet. Additionally, various embodiments use wireless networks other than Wi-Fi, for example a cellular network or a Bluetooth network.

The system A can provide an output signal to various output devices using the communication network 71 or the bus 705. For example, the system A can provide a HDR video.

The system A can provide an output signal to various output devices, including the HDR display 15, speakers 76, and other peripheral devices 77. The HDR display 15 of various embodiments includes one or more of, for example, a touchscreen display, an organic light-emitting diode (OLED) display, a curved display, and/or a foldable display. The HDR display 15 can be for a television, a tablet, a laptop, a cell phone (mobile phone), or other devices. The HDR display 15 can also be integrated with other components (for example, as in a smart phone), or separate (for example, an external monitor for a laptop). The other peripheral devices 77 include, in various examples of embodiments, one or more of a stand-alone digital video disc (or digital versatile disc) (DVR, for both terms), a disk player, a stereo system, and/or a lighting system. Various embodiments use one or more peripheral devices 77 that provide a function based on the output of the system A. For example, a disk player performs the function of playing the output of the system A.

In various embodiments, control signals are communicated between the system A and the HDR display 15, speakers 76, or other peripheral devices 77 using signaling such as AV.Link, Consumer Electronics Control (CEC), or other communications protocols that enable device-to-device control with or without user intervention. The output devices can be communicatively coupled to system A via dedicated connections through respective interfaces 73, 74, and 75. Alternatively, the output devices can be connected to system A using the communication network 71 via the communication interface 704. The HDR display 15 and speakers 76 can be integrated in a single unit with the other components of system A in an electronic device such as, for example, a television. In various embodiments, the display interface 73 includes a display driver, such as, for example, a timing controller (T Con) chip.

The HDR display 15 and speakers 76 can alternatively be separate from one or more of the other components, for example, if the RF module of block 72 is part of a separate set-top box. In various embodiments in which the HDR display 15 and speakers 76 are external components, the output signal can be provided via dedicated output connections, including, for example, HDMI ports, USB ports, or COMP outputs.

FIG. 7B illustrates a block diagram of an example of the system B adapted to implement the pre-processing module 11 in which various aspects and embodiments are implemented.

System B can be embodied as a device including the various components and modules described above and is configured to perform one or more of the aspects and embodiments described in this document.

Examples of such devices include, but are not limited to, various electronic devices such as personal computers, laptop computers, a camera, a smartphone and a server. Elements or modules of system B, singly or in combination, can be embodied in a single integrated circuit (IC), multiple ICs, and/or discrete components. For example, in at least one embodiment, the system B comprises one processing module 70 that implement the pre-processing module 11. In various embodiments, the system B is communicatively coupled to one or more other systems, or other electronic devices, via, for example, a communications bus or through dedicated input and/or output ports.

The input to the processing module 70 can be provided through various input modules as indicated in block 72 already described in relation to FIG. 7C.

Various elements of system B can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system B, the processing module 70 is interconnected to other elements of said system B by the bus 705.

The communication interface 704 of the processing module 70 allows the system B to communicate on the communication network 71. The communication network 71 can be implemented, for example, within a wired and/or a wireless medium.

Data is streamed, or otherwise provided, to the system B, in various embodiments, using a wireless network such as a Wi-Fi network, for example IEEE 802.11 (IEEE refers to the Institute of Electrical and Electronics Engineers). The Wi-Fi signal of these embodiments is received over the communications network 71 and the communications interface 704 which are adapted for Wi-Fi communications. The communications network 71 of these embodiments is typically connected to an access point or router that provides access to external networks including the Internet for allowing streaming applications and other over-the-top communications. Still other embodiments provide streamed data to the system B using the RF connection of the input block 72. As indicated above, various embodiments provide data in a non-streaming manner.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), smartphones, tablets, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations or embodiments can produce a variety of signals formatted to carry information that can be, for example, stored or transmitted. The information can include, for example, instructions for performing a method, or data produced by one of the described implementations or embodiments. For example, a signal can be formatted to carry a SDR image or video sequence and SL-HDRx metadata of a described embodiment. Such a signal can be formatted, for example, as an electromagnetic wave (for example, using a radio frequency portion of spectrum) or as a baseband signal. The formatting can include, for example, encoding a SDR image or video sequence with SL-HDR1 metadata in an encoded stream and modulating a carrier with the encoded stream. The information that the signal carries can be, for example, analog or digital information. The signal can be transmitted over a variety of different wired or wireless links, as is known. The signal can be stored on a processor-readable medium.

Figure 2:
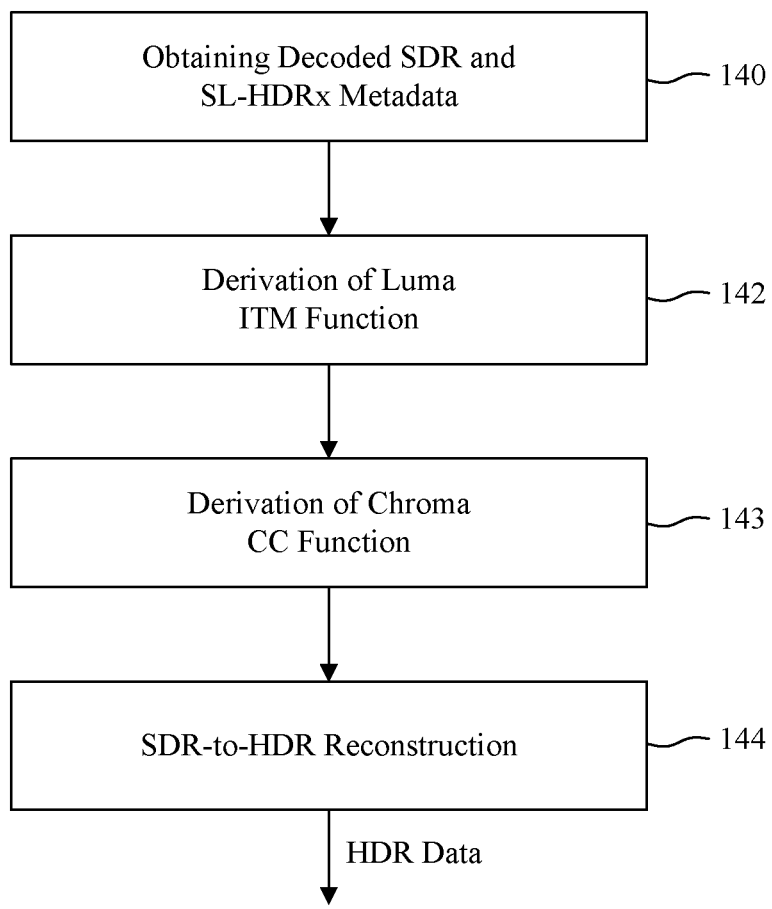
FIG. 2 illustrates a post-processing process allowing generating a HDR picture from a SDR picture.

FIG. 2 illustrates a post-processing process allowing generating a HDR picture from a SDR picture.

The post-processing process described in FIG. 2 is a summary of the post-processing process described in section 7.2.4 of the standard SL-HDR1 (ETSI TS 103 433-1 V1.4.1, High-Performance Single Layer High Dynamic Range (HDR) Systemfor use in Consumer Electronics devices; Part 1: Directly Standard Dynamic Range (SDR) Compatible HDR System (SL-HDR1)).

The post-processing process of FIG. 2 is for instance executed by the processing module 70 of the system A when this module implements the post-processing module 14.

In a step 140, the processing module 70 obtains a decoded SDR video and SL-HDR1 metadata. In that case, the system A has received an encoded video stream comprising the SDR video and the SL-HDR1 metadata and has decoded this video stream using a decoding module such as the decoding module 13.

In a step 142, the processing module 70 derives an ITM function to be applied to a luma (i.e. luminance) component of the SDR video from the SL-HDR1 metadata. During step 142, the process described in section 7.2.3.1 of the SL-HDR1 specification is applied.

In a step 143, the processing module 70 derives a color correction function to be applied to chroma (i.e. chrominance) components of the SDR video from the SL-HDR1 metadata. During step 143, the process described in section 7.2.3.2 of the SL-HDR1 specification is applied.

In a step 144, the processing module 70 reconstructs a HDR video from the SDR video and the SL-HDR1 metadata. During step 144, the process described in section 7.2.4 of the SL-HDR1 specification is applied. An example of implementation of step 144 is detailed in relation to FIG. 3.

Figure 3:
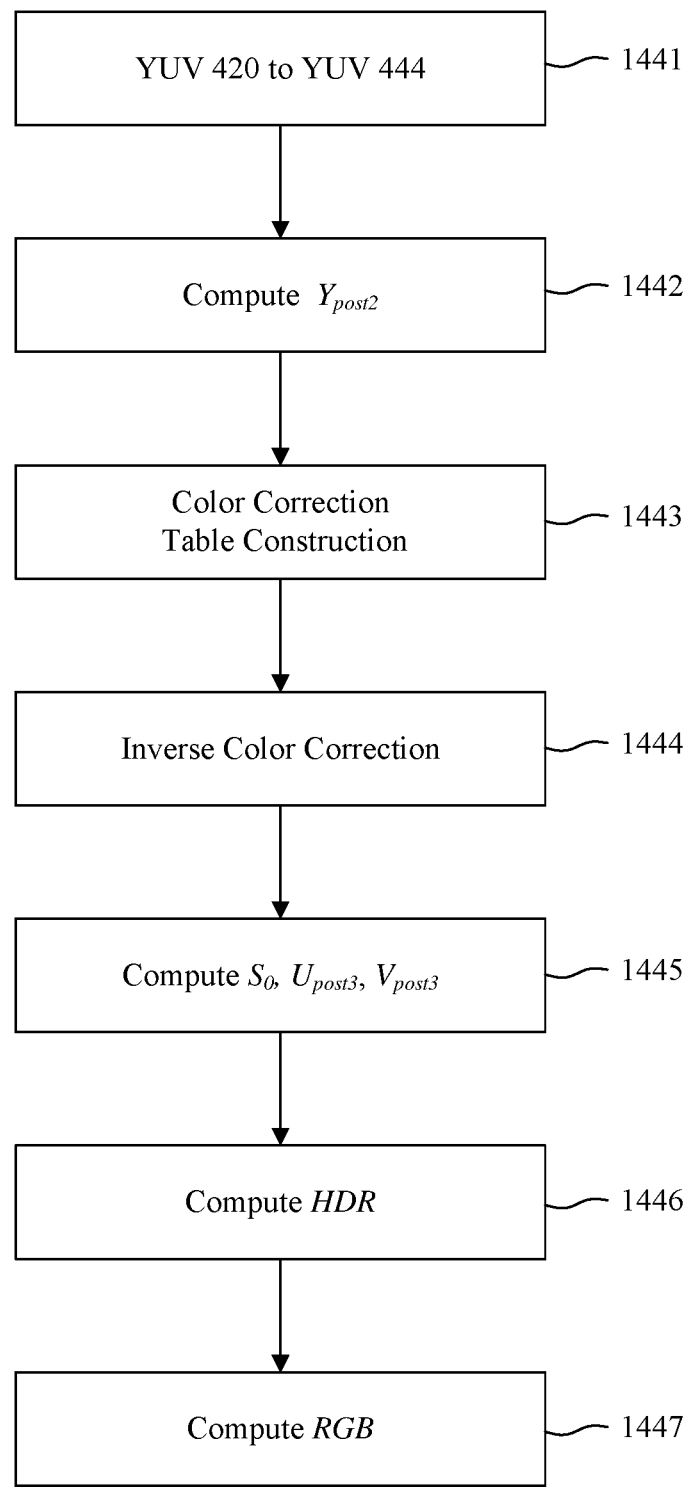
FIG. 3 illustrates a SDR to HDR reconstruction process.

FIG. 3 illustrates a SDR to HDR reconstruction process

In general, the decoded SDR video is represented in YUV 420 format with a limited range while the internal calculations in the post-processor are performed in YUV 444 format with a full range. A limited range means that a range of possible values defined by the bit-depth (8 bits, 10 bits, 12 bits, etc) is not fully occupied. An example of a typical limited range for a bit-depth of 10 bits for a Y (respectively for a U or V) component is [64; 940](respectively [64; 960]) while the full range allowed by the 10 bits is [0; 1023].

The process of FIG. 3 is executed for each picture of the SDR video, called SDR picture in the following.

In a step 1441, the processing module 70 converts a current SDR picture in a converted picture in YUV 444 format with a full range. To do so, the processing module 70 starts by up-sampling the chroma components of the input SDR picture to obtain a SDR picture in YUV 444 format. Then, each component of each sample of the picture in YUV 444 format is converted from the limited range to the full range, for example, by applying the following process:

$$Y_{in} = (Y_{in\_lr} - 64)/876 \times 1023$$
$$U_{in} = (U_{in\_lr} - 512)/896 \times 1023 + 512$$
$$V_{in} = (V_{in\_lr} - 512)/896 \times 1023 + 512$$

where $Y_{in\_lr}$, $U_{in\_lr}$ and $V_{in\_lr}$ are the three components of a sample of the SDR picture in YUV 444 format and $Y_{in}$, $U_{in}$ and $V_{in}$ are three components of a corresponding sample of the converted picture. In other words, the processing module 70 converts the values representative of the samples (i.e. the Y, U and V components) of the SDR picture in YUV 444 format from a first range (i.e. the limited range) to a second range (i.e. the full range), the second range being larger than the first range. During step 1441, the processing module 70 centers the obtained chroma components $U_{in}$ and $V_{in}$ using equation (25) of section 7.2.4 of the SL-HDR1 specification to obtain centered components $U_{post1}$ and $V_{post1}$:

$$\begin{cases} U_{post1} = U_{in} - midSampleVal \\ V_{post1} = V_{in} - midSampleVal \end{cases}$$

where the value midSampleVal is defined in the SL-HDR1 specification (512 for 10 bits components).

One can note that the current SDR picture could be in another format such as the format YUV 444. In that last case, no up-sampling of the chroma components is required.

In a step 1442, the processing module 70 determines if all samples of the converted picture have been processed. If at least one sample of the converted picture remains to be processed, step 1442 is followed by steps 1443 to 1447. Steps 1443 to 1447 are applied to one sample of the converted picture, called current sample in the following.

In step 1443, the processing module 70 computes a luma component $Y_{post2}$. To do so, the processing module first applies a re-saturation to the luma component $Y_{in}$ of the current sample using equation (26) specified in section 7.2.4 of the SL-HDR1 specification to obtain a re-saturated luma component $Y_{post1}$:

$$Y_{post1} = Y_{in} + \text{Max}(0; mu_0 \times U_{post1} + mu_1 \times V_{post1})$$

The re-saturated value $Y_{post1}$ is then clamped in the range [0; 1023] using equation (27) of section 7.2.4 of the SL-HDR1 specification to obtain the luma component value $Y_{post2}$:

$$Y_{post2} = \text{Clip3}(0; maxSampleVal - 1; Y_{post1})$$

In a step 1444, the processing module 70 computes a color correction function using SL-HDR1 metadata. The computation of the color correction function amounts in constructing a color correction look-up table lutCC[ ]. The construction of the look-up table lutCC[ ] use equation (21) and (22) of section 7.2.3.2 of the SL-HDR1 specification as follows:

$$lutCC[0] = 0.125$$

$$lutCC[Y] = \text{Min}\left(lutCC[0]; \frac{1}{\text{Max}(R_{sgf}/255; R_{sgf} \times g(Y_n))} \times L(Y_n)\right)$$

where $$Y_n = \frac{Y}{maxSampleVal - 1},$$

and g( ), L( ) and $R_{sgf}$ being defined in the SL-HDR1 specification.

In a step 1445, the processing module 70 applies an inverse color correction to the chroma components values $U_{post1}$ and $V_{post1}$ using the look-up table lutCC[ ]. To do so, the processing module 70 applies equation (28) of section 7.2.4:

$$\begin{cases} U_{post2} = lutCC[Y_{post2}] \times U_{post1} \\ V_{post2} = lutCC[Y_{post2}] \times V_{post1} \end{cases}$$

In a step 1446, the processing module 70 computes components $S_0$, $U_{post3}$, $V_{post3}$. Components $S_0$, $U_{post3}$ and $V_{post3}$ are computed using equations (29) and (30) specified in section 7.2.4 of the SL-HDR1 specification as follows:

$S_0$ is initialized to zero.

$$T = k_0 \times U_{post2} \times V_{post2} + k_1 \times U_{post2} \times U_{post2} + k_2 \times V_{post2} \times V_{post2}$$

If $(T \le 1)$, $S_0 = \sqrt{1-T}$, $U_{post3} = U_{post2}$ and $V_{post3} = V_{post2}$ Otherwise (T>1), $U_{post3}$ and $V_{post3}$ are derived from $U_{post2}$ and $V_{post2}$ as follows:

$$\begin{cases} U_{post3} = \dfrac{U_{post2}}{\sqrt{T}} \\ V_{post3} = \dfrac{V_{post2}}{\sqrt{T}} \end{cases}$$

The most used implementation of SL-HDR1, called non-constant luminance (NCL) mode, specifies that $k_0=k_1=k_2=0$. Therefore, in the NCL mode, $S_0$, $U_{post3}$, $V_{post3}$ are defined as follows:

$S_0=1$ $U_{post3}=U_{post2}$ $V_{post3}=V_{post2}$

In most of the cases, these equations are sufficient to render accurately HDR video in the NCL mode. However, some errors may occur in some particular cases.

As an example, an integer implementation of the post-processor module 14 in NCL mode could use a precision of 14 bits+1 bit for sign for an internal representation of chroma values $U_{post2}$ and $V_{post2}$ while a precision of 9 bits+1 bit for sign is used for a representation of the chroma values $U_{post3}$ and $V_{post3}$.

In this integer implementation and for some very saturated red and blue colors in the SDR video (provided, for instance, by the pre-processor 11), $U_{post2}$ and/or $V_{post2}$ could have an absolute value higher than 9 bits. In that case, the conversion from $U_{post2}/V_{post2}$ on 14 bits+1 bit for sign to $U_{post3}/V_{post3}$ on 9 bits+1 bit for sign implies clipping when $U_{post2}/V_{post2}$ has an absolute value higher than 9 bits. Such clipping is at the origin of errors in the reconstructed HDR image.

In a step 1447, the processing module 70 derives RGB values of a sample of a HDR picture corresponding to the current sample from the values $S_0$, $U_{post3}$ and $V_{post3}$ using equations (31), (32) and (33) of section 7.2.4 of the SL-HDRT specification.

When all samples of the converted picture have been processed, the processing module stops the computation of the HDR picture.

Figure 4:
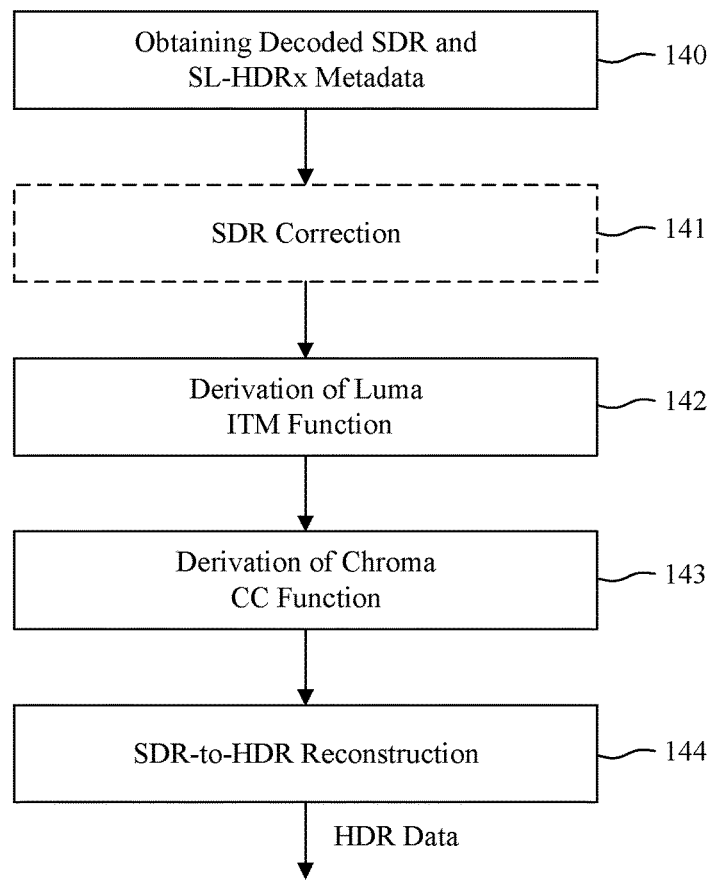
FIG. 4 illustrates an example of a post-processing process allowing generating a HDR picture from a SDR picture of an embodiment.

FIG. 4 illustrates an example of a post-processing process allowing generating a HDR picture from a SDR picture wherein the risk of clipping is limited.

As illustrated in FIG. 4, an additional step 141 is introduced in the post-processing process of FIG. 2 between steps 140 and 142.

In step 141, the processing module 70 applies a correction process to the SDR video obtained in step 140. The correction process is detailed in FIGS. 5 and 6. Steps 142 to 144 are then applied on a corrected version of the SDR video instead of being applied on the original SDR video decoded from the video stream.

Figure 5:
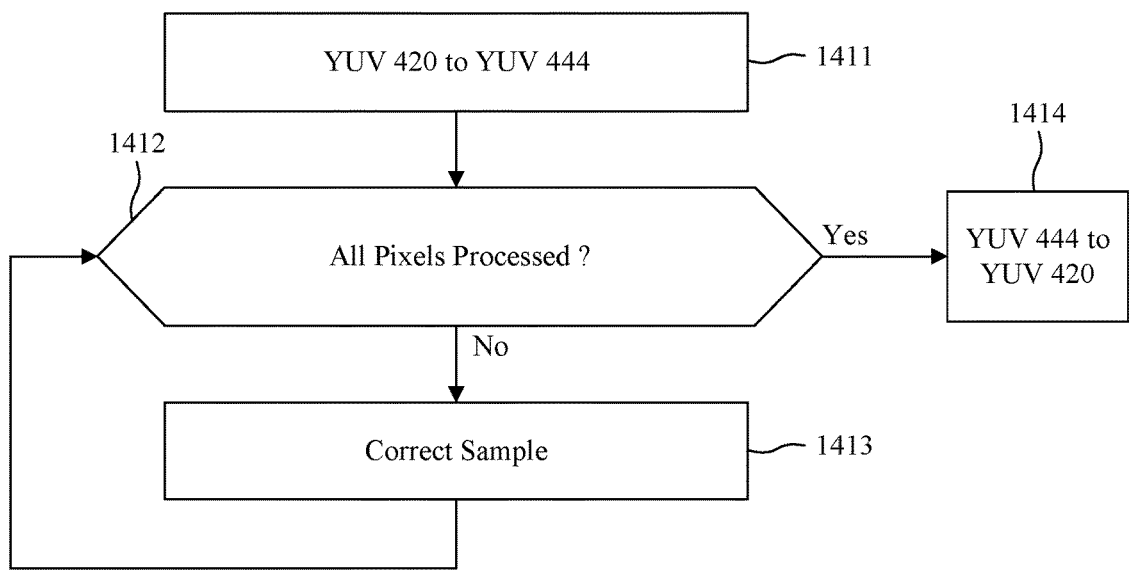
FIG. 5 illustrates a correction process applied to a SDR picture.

FIG. 5 illustrates the correction process applied to a SDR picture.

The purpose of the process of FIG. 5 is to prevent any clipping of the chroma components values $U_{post2}$ and $V_{post2}$. The process of FIG. 5 is applied to each SDR picture of the decoded SDR video.

In a step 1411, the processing module 70 converts a current SDR picture in a converted picture in YUV 444 format with a full range applying the same process than in step 1441.

In a step 1412, the processing module 70 determines if all samples of the converted picture have been processed. If at least one sample of the converted picture remains to be processed, step 1412 is followed by steps 1413. Steps 1413 is applied to one sample of the converted picture, called current sample in the following.

During step 1413, the processing module 70 corrects the current sample, if necessary, i.e. if the current sample risk to provoke a clipping during the post-processing. Step 1413 is detailed in relation to FIG. 6.

If all samples of the converted picture have been processed, the processing module converts the corrected converted picture (in YUV 444 format with full range) back to a SDR picture in YUV 420 format and limited range. This conversion is typically done as follow:

$$Y_{in\_corr\_lr} = (INT)(Y_{in\_corr}/1023 * 876 + 64.5)$$

$$U_{in\_corr\_lr} = (INT)(U_{in\_corr}/1023 * 896 + 512.5)$$

$$V_{in\_corr\_lr} = (INT)(V_{in\_corr}/1023 * 896 + 512.5)$$

where $Y_{in\_corr}$, $U_{in\_corr}$ and $V_{in\_corr}$ are the components of a sample of the corrected converted picture and $Y_{in\_corr\_lr}$, $U_{in\_corr\_lr}$ and $V_{in\_corr\_lr}$ are the components of a sample of the corrected converted picture in YUV 420 format and limited range.

Figure 6:
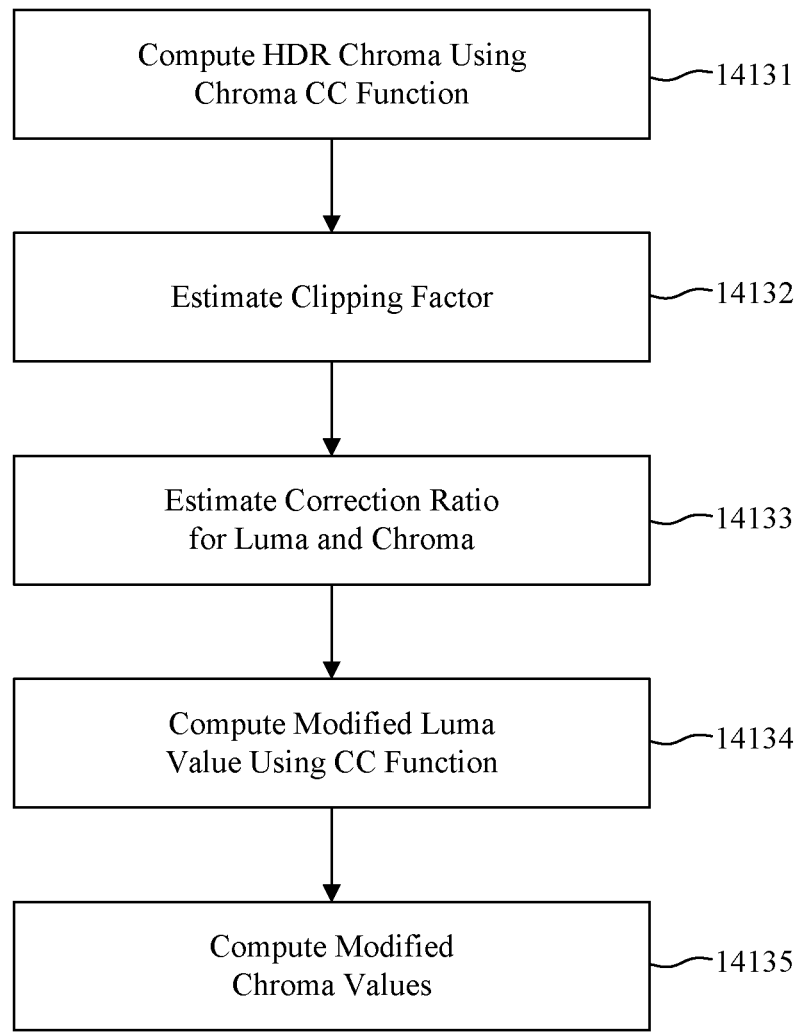
FIG. 6 illustrates a detail of the correction process.

FIG. 6 illustrates a detail of the correction process of step 1413.

FIG. 6 illustrates a correction process applied to a current sample of a converted picture, the same process being applied to each sample of the converted picture.

In a step 14131, the processing module 70 computes chroma components of a sample from the chroma components of the current sample using a color correction function. In an embodiment, during step 14131, the processing module 70 executes steps 1443 to 1446 described in relation to FIG. 3. In other words, the processing module 70 computes the chroma components $U_{post3}$ and $V_{post3}$ from the components of the current sample using the color correction function represented by the look-up table lutCC[ ].

In a step 14132 the processing module 70 estimates a clipping factor div_UV based on the computed chroma components $U_{post3}$ and $V_{post3}$ and on a precision of the components $U_{post3}$ and $V_{post3}$ computed in step 1446. The purpose of step 14132 is to estimate, depending on the post-processor module 14 implementation, when the values $U_{post3}$ and $V_{post3}$ risk to be clipped.

Taking again the example of the integer implementation of the post-processor module 14 in NCL mode using a precision of 14 bits+1 bit for sign for an internal representation of chroma values $U_{post2}$ and $V_{post2}$ and a precision of 9 bits+1 bit for sign for a representation of the chroma values $U_{post3}$ and $V_{post3}$, a maximum absolute value that can be taken by $U_{post3}$ (respectively $V_{post3}$) is Umax (respectively Vmax) equal to "$2^9$=511". All absolute values of $U_{post2}$ (respectively $V_{post2}$) greater than "511" are clipped to "511" when converted to 9 bits+1 bit for sign to compute $U_{post3}$ and $V_{post3}$.

The following process is applied during step 14132 to determine the clipping factor div_UV (all computations being performed in floating points):

$$\text{if } (U_{post2} > U_{max})$$
$$\text{div\_U} = U_{post2} / U_{max};$$
$$\text{if } (U_{post2} < -U_{max})$$
$$\text{div\_U} = -U_{post2} / U_{max};$$
$$\text{if } (V_{post2}) > V_{max})$$
$$\text{div\_V} = V_{post2}) / V_{max};$$
$$\text{if } (V_{post2}) < -V_{max})$$
$$\text{div\_V} = -V_{post2}) / V_{max};$$
$$\text{div\_UV} = \text{MAX}(\text{div\_U}, \text{div\_V});$$

In a step 14133, the processing module 70 represents each computed chroma component $U_{post3}$ and $V_{post3}$ as a multiplication of a first sub-part depending on a luma component of the current sample and a second sub-part depending on a corresponding chroma component of the current sample and obtains a first ratio partY of a correction factor based on the clipping factor to be applied to the first sub-part and a second ratio (1-partY) of the correction factor to be applied to the second sub-part.

As detailed in eq (29) of the SL-HDR1 specification:

$$U_{post3} = lutCC[Y_{post2}] \cdot U_{post1}$$
$$V_{post3} = lutCC[Y_{post2}] \cdot V_{post1}$$

When the clipping factor div_UV for the current sample is greater than "1", this means that the chroma components $U_{post3}$ and $V_{post3}$ need to be modified as follow:

$$U_{post3_{target}} =$$
$$\frac{U_{post3}}{\text{div\_UV}} = \frac{lutCC[Y_{post2}] \cdot U_{post1}}{\text{div\_UV}} = \frac{lutCC[Y_{post2}]}{\text{div\_UV}^{partY}} \cdot \frac{U_{post1}}{\text{div\_UV}^{(1-partY)}}$$

$$V_{post3_{target}} =$$
$$\frac{V_{post3}}{\text{div\_UV}} = \frac{lutCC[Y_{post2}] \cdot V_{post1}}{\text{div\_UV}} = \frac{lutCC[Y_{post2}]}{\text{div\_UV}^{partY}} \cdot \frac{V_{post1}}{\text{div\_UV}^{(1-partY)}}$$

$lutCC[Y_{post2}]$ corresponds to the first sub-part and $U_{post1}$ corresponds to the second sub-part. As can be seen, one part of the correction applies to the first sub-part $lutCC[Y_{post2}]$ that depends on the Luma component $Y_{post2}$ that depends directly on the luma component $Y_{in}$ of the converted picture. A second part of the correction applies to the chroma components $U_{post1}$ and $V_{post1}$ that depend directly on the chroma components $U_{in}$ and $V_{in}$ of the converted picture.

The first ratio partY defines what correction needs to be applied to the luma component of the converted picture and, via the second ratio (1-partY), what correction needs to be applied to the chroma components of the converted picture to avoid any clipping at the post-processor module 14 side.

The ratio partY has a direct influence on the displayed SDR video. If the correction is applied only on the luma component $Y_{in}$ of the current sample, i.e. partY=1, the corrected sample is appearing much brighter when compared to the corresponding sample in the decoded SDR picture. If the correction is applied only on the chroma components $U_{in}$ and $V_{in}$ of the current sample, i.e. partY=0, the corrected sample is appearing much darker when compared to the corresponding sample of the decoded SDR picture.

In an embodiment, the first ratio partY is a pre-determined fixed value defined for all samples. This fixed value can be selected by finding the best compromise for a set of selected SDR pictures that originally make the post-processor module clip, the best compromise being the ratio partY minimizing a visual difference between the decoded SDR picture and the corrected SDR picture.

In an embodiment, the first ratio partY is predetermined but dynamic between pictures, i.e. it can adapt to the characteristics of each picture. In that case, the ratio partY is the same for an entire picture. For instance, the ratio partY depends on a brightness of the current picture, or on its relative saturation. As an example, if the picture is a relatively bright picture, partY may need to have a higher value than for a dark picture. The mean brightness value of the entire picture can then be used to adjust partY value for the entire picture. Similarly, if the picture is a relatively saturated picture, (1-partY) may need to have a higher value than for a dark picture. The mean saturation value of the entire picture can then be used to adjust partY value for the entire picture.

In an embodiment, the ratio partY is predetermined but dynamic within a picture, i.e. it can adapt to the characteristics of each sample. In that case, the ratio partY is not the same for an entire picture. For instance, the ratio partY could depend on the brightness of the current sample, or on its relative saturation. As an example, if the current sample is a relatively bright sample, partY may need to have a higher value than for a dark sample. The brightness value of the current sample can then be used to adjust partY value for the current sample. Similarly, if the current sample is a relatively saturated sample, (1-partY) may need to have a higher value than for a dark sample. The saturation value of the current sample can then be used to adjust partY value for the current sample.

In an embodiment, the ratio partY value is fixed to "0.75" for all samples, therefore (1−partY)=0.25. It has a limited impact on the perception of the corrected picture and it has the advantage of being efficiently implemented on CPU based platforms. Indeed, in CPU based platforms, the square root function is very efficient and very fast, while the power function is a lot slower and less efficient. Using partY=0.75 leads to the following computations:

$$\text{div\_UV}^{(1-partY)} =$$
$$\text{div\_UV}^{0.25} = \text{div\_UV}^{0.5 \times 0.5} = sqrt(\text{div\_UV}) \cdot sqrt(\text{div\_UV})$$

$$\text{div\_UV}^{partY} =$$
$$\text{div\_UV}^{0.75} = \text{div\_UV}^{1-0.25} = \frac{\text{div\_UV}}{\text{div\_UV}^{0.25}} = \frac{\text{div\_UV}}{sqrt(\text{div\_UV}) \cdot sqrt(\text{div\_UV})}$$

In a step 14134, the processing module 70 computes a corrected luma value $Y_{in\_corr}$ of a sample of a corrected SDR picture corresponding to the current sample using a division of the first sub-part by the correction factor to a power equal to the first ratio as follows $$lutCC[Y_{in\_corr}] = \frac{lutCC[Y_{post2}]}{div\_UV^{partY}}$$

In a first embodiment of step 14134, as the color correction function represented by the look-up table lutCC[ ] is always a monotonic decreasing function, this can be done by increasing a value $Y_{in\_corr}$ progressively with small increment values $\Delta$ (for example $\Delta$=1) until finding a value of $Y_{in\_corr}$ such that $$lutCC[y_{in\_corr}] < \frac{lutCC[Y_{post2}]}{div\_UV^{partY}}.$$

The final value of $y_{in\_corr}$ respecting the condition $$lutCC[y_{in\_corr}] < \frac{lutCC[Y_{post2}]}{div\_UV^{partY}}$$

corresponds to the searched value $Y_{in\_corr}$.

In a second embodiment of step 14134, the corrected luma value $Y_{in\_corr}$ is computed by dichotomy.

In a third embodiment of step 14134, the corrected luma value $Y_{in\_corr}$ is computed directly by computing the inverse of the color correction function. The inverse color correction function is represented by a look-up table inv lutCC[ ]. The corrected luma value $Y_{in\_corr}$ is computed as follows:

$$Y_{in\_corr} = \text{inv\_lutCC}\left[\frac{lutCC[Y_{post2}]}{div\_UV^{partY}}\right]$$

In a step 14135, for each chroma component ($U_{in}$ and $V_{in}$), the processing module 70 computes a chroma value ($U_{in\_corr}$ or $V_{in\_corr}$) for the sample of the corrected SDR picture corresponding to the current sample by using a division of the second sub-Part of the chroma component by the correction factor to a power equal to the second ratio as follows:

$$U_{in\_corr} = \frac{U_{post1}}{div\_UV^{(1-partY)}}$$

$$V_{in\_corr} = \frac{V_{post1}}{div\_UV^{(1-partY)}}$$

At the end of the process of FIG. 6, the processing module 70 obtains a corrected sample with components $Y_{in\_corr}$, $U_{in\_corr}$ and $V_{in\_corr}$.

In the embodiments described until now, the SDR correction step 141 is performed during the post-processing process by the post-processing module 14.

In another embodiment, the SDR correction step 141 is performed during the pre-processing process by the pre-processing module 11. In that case, the SDR video that is encoded along with the SL-HDR1 metadata by the encoding module 12 comprises corrected SDR pictures resulting from an application of the SDR correction step 141 on the SDR video provided by the source module 10 (or resulting from an ITM applied to the HDR video provided by the source 10). In this embodiment, the post-processing module 14 doesn't have to correct the SDR pictures to avoid a clipping since it has already been done by the pre-processing module 11.

We described above a number of embodiments. Features of these embodiments can be provided alone or in any combination. Further, embodiments can include one or more of the following features, devices, or aspects, alone or in any combination, across various claim categories and types:

A bitstream or signal that includes a corrected SDR video, or variations thereof.

Creating and/or transmitting and/or receiving and/or decoding a bitstream or signal that includes a corrected SDR video, or variations thereof.

A server, camera, TV, set-top box, cell phone, tablet, personal computer or other electronic device that performs at least one of the embodiments described.

A TV, set-top box, cell phone, tablet, personal computer or other electronic device that performs at least one of the embodiments described, and that displays (e.g. using a monitor, screen, or other type of display) a resulting picture.

A TV, set-top box, cell phone, tablet, personal computer or other electronic device that tunes (e.g. using a tuner) a channel to receive a signal including an encoded SDR video and SL-HDR1 metadata, and performs at least one of the embodiments described.

A TV, set-top box, cell phone, tablet, or other electronic device that receives (e.g. using an antenna) a signal over the air that includes an encoded SDR video and SL-HDR1 metadata, and performs at least one of the embodiments described.

A server, camera, cell phone, tablet, personal computer or other electronic device that tunes (e.g. using a tuner) a channel to transmit a signal including a corrected SDR video and SL-HDR1 metadata, and performs at least one of the embodiments described.

A server, camera, cell phone, tablet, personal computer or other electronic device that transmits (e.g. using an antenna) a signal over the air that includes a corrected SDR video and SL-HDR1 metadata, and performs at least one of the embodiments described.

The invention claimed is:

1. A method comprising:

obtaining chroma components from a current sample of an input standard-dynamic-range (SDR) picture using a color correction function;

determining a clipping factor based on the obtained chroma components and on a first range;

representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor;

obtaining a luma value of a sample of a corrected SDR picture corresponding to the sample of the input SDR picture using a division of the first sub-part by the correction factor to a power equal to the first ratio; and, for each chroma component, obtaining a chroma value for the sample of the corrected SDR picture corresponding to the sample of the input SDR picture by dividing the second sub-part of the chroma component by the correction factor to a power equal to the second ratio.

2. The method of claim 1 wherein the first and second ratio depend on a characteristic of the current sample, the characteristic comprising at least one of a value representative of a brightness of the current sample and/or a value representative of a saturation of the current sample.

3. A method wherein the method of claim 1 is applied to all samples of an input SDR picture and wherein the first and second ratio is fixed for all samples of the input SDR picture and depends on a characteristic of the input SDR picture, the characteristic comprising at least one of a value representative of a brightness of the input SDR picture and/or a value representative of a saturation of the input SDR picture.

4. A method wherein the method of claim 1 is applied to all samples of an input SDR picture of a SDR video and wherein the first and the second ratio are fixed for all samples of all SDR pictures of the SDR video.

5. The method of claim 1 wherein the first and the second ratio depends on a single value.

6. A method wherein the method of claim 1 is performed in a process for generating SDR pictures or in a process for ingesting SDR pictures.

7. A device comprising electronic circuitry configured for:
obtaining chroma components from a current sample of an input standard-dynamic-range (SDR) picture using a color correction function;
determining a clipping factor based on the obtained chroma components and on a first range;
representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor;
obtaining a luma value of a sample of a corrected SDR picture corresponding to the sample of the input SDR picture by using a division of the first sub-part by the correction factor to a power equal to the first ratio; and,
for each chroma component, obtaining a chroma value for the sample of the corrected SDR picture corresponding to the sample of the input SDR picture by using a division of the second sub-part of the chroma component by the correction factor to a power equal to the second ratio.

8. The device of claim 7 wherein the first and second ratio depend on a characteristic of the current sample, the characteristic comprising at least one of a value representative of a brightness of the current sample and/or a value representative of a saturation of the current sample.

9. A device comprising electronic circuitry adapted to process each sample of an input standard-dynamic-range (SDR) picture by:
obtaining chroma components from a current sample of an input SDR picture using a color correction function;
determining a clipping factor based on the obtained chroma components and on a first range;
representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor;
obtaining a luma value of a sample of a corrected SDR picture corresponding to the sample of the input SDR picture by dividing the first sub-part by the correction factor to a power equal to the first ratio; and,
for each chroma component, obtaining a chroma value for the sample of the corrected SDR picture corresponding to the sample of the input SDR picture by dividing the second sub-part of the chroma component by the correction factor to a power equal to the second ratio,
wherein the first and second ratio are fixed for all samples of the input SDR picture and depends on a characteristic of the input SDR picture, the characteristic comprising a value representative of a brightness of the input SDR picture and/or a value representative of a saturation of the input SDR picture.

10. A device comprising electronic circuitry adapted to process each sample of an input standard-dynamic-range (SDR) picture of a SDR video by:
obtaining chroma components from a current sample of an input SDR picture using a color correction function;
determining a clipping factor based on the obtained chroma components and on a first range;
representing each obtained chroma component as a multiplication of a first sub-part depending on a luma component of the sample of the input SDR picture and a second sub-part depending on a corresponding chroma component of the sample of the input SDR picture and obtaining a first ratio of a correction factor to be applied to the first sub-part and a second ratio of the correction factor to be applied to the second sub-part, the correction factor being based on the clipping factor;
obtaining a luma value of a sample of a corrected SDR picture corresponding to the sample of the input SDR picture using a division of the first sub-part by the correction factor to a power equal to the first ratio; and,
for each chroma component, obtaining a chroma value for the sample of the corrected SDR picture corresponding to the sample of the input SDR picture by using a division of the second sub-part of the chroma component by the correction factor to a power equal to the second ratio,
wherein the first and the second ratio are fixed for all samples of all SDR pictures of the SDR video.

11. The device of claim 7 wherein the first and the second ratio depends on a single value.

12. The device of claim 7 wherein the device is for generating SDR pictures or for ingesting SDR pictures.

13. Non-transitory information storage medium storing program code instructions for implementing the method according to claim 1.

* * * * *